(12) United States Patent
Tsuchimochi et al.

(10) Patent No.: US 10,318,945 B2
(45) Date of Patent: Jun. 11, 2019

(54) POS-TERMINAL DEVICE

(71) Applicant: NEC Corporation, Tokyo (JP)

(72) Inventors: Kazuki Tsuchimochi, Tokyo (JP); Kota Iwamoto, Tokyo (JP); Tetsuo Inoshita, Tokyo (JP); Soma Shiraishi, Tokyo (JP); Hiroshi Yamada, Tokyo (JP); Jun Kobayashi, Tokyo (JP); Eiji Muramatsu, Tokyo (JP); Michio Nagai, Tokyo (JP); Hideo Yokoi, Tokyo (JP)

(73) Assignee: NEC Corporation, Tokyo (JP)

( * ) Notice: Subject to any disclaimer, the term of this patent is extended or adjusted under 35 U.S.C. 154(b) by 423 days.

(21) Appl. No.: 15/129,758

(22) PCT Filed: Mar. 25, 2015

(86) PCT No.: PCT/JP2015/060300
§ 371 (c)(1),
(2) Date: Sep. 27, 2016

(87) PCT Pub. No.: WO2015/147328
PCT Pub. Date: Oct. 1, 2015

(65) Prior Publication Data
US 2017/0178108 A1    Jun. 22, 2017

(30) Foreign Application Priority Data
Mar. 28, 2014  (JP) .................................. 2014-067814

(51) Int. Cl.
*G06Q 20/20* (2012.01)
*G07G 1/01* (2006.01)
*G07G 1/00* (2006.01)
*G06K 9/20* (2006.01)
*G06K 9/00* (2006.01)

(52) U.S. Cl.
CPC ....... *G06Q 20/208* (2013.01); *G06K 9/00912* (2013.01); *G06K 9/2036* (2013.01); *G07G 1/0045* (2013.01); *G07G 1/01* (2013.01); *G06Q 20/20* (2013.01)

(58) Field of Classification Search
CPC ..................................................... G06Q 20/20
See application file for complete search history.

(56) References Cited

FOREIGN PATENT DOCUMENTS

| JP | 4-58776 | 5/1992 |
|---|---|---|
| JP | 4-347783 | 12/1992 |
| JP | 5-324897 | 12/1993 |

(Continued)

OTHER PUBLICATIONS

Japanese Office Action dated May 30, 2017 for counterpart Japanese Application No. 2016-510585.

(Continued)

*Primary Examiner* — A. Hunter Wilder
(74) *Attorney, Agent, or Firm* — Finnegan, Henderson, Farabow, Garrett & Dunner, L.L.P.

(57) ABSTRACT

A POS-terminal device includes: a housing that is provided with a product-reading device including an imaging unit configured to capture a product to generate an image; a product-input unit configured to input the product, the product-input unit including a product-reading frame configured to define an outer edge of an imaging area of the imaging unit; and a reflector configured to reflect a subject image of the product passed over the imaging area, outside the housing.

9 Claims, 6 Drawing Sheets

(56) References Cited

FOREIGN PATENT DOCUMENTS

| JP | 2011-113218 | 6/2011 |
| JP | 2012-18580 | 1/2012 |
| JP | 2013-77330 | 4/2013 |
| JP | 2013-182326 | 9/2013 |

OTHER PUBLICATIONS

International Search Report and Written Opinion dated Jun. 9, 2015, in corresponding PCT International Application.

POS-TERMINAL DEVICE

CROSS-REFERENCE TO RELATED PATENT APPLICATIONS

This application is a national phase application of International Application No. PCT/JP2015/060300, filed Mar. 25, 2015, and claims the priority of Japanese Application No. 2014-067814, filed Mar. 28, 2014, the content of both of which are incorporated herein by reference.

TECHNICAL FIELD

The present invention relates to a POS-terminal device in which a product is passed over an imaging unit (camera) and the product can be image-recognized.

BACKGROUND ART

In a supermarket or the like, a method for scanning a bar code or a two-dimensional code (for example, QR (Quick Response) code (registered trademark)) attached to a product using a dedicated scanning device is generally used. There is also a self-checkout machine in which a customer oneself operates POS (Point Of Sales) terminal directly. In any case, in a product to which a bar code is attached, a trouble to search for a position of the product where the bar code is attached may occurred, or the POS terminal operation may take time.

Further, for a product to which a bar code is not attached in advance, such as fresh food and bread, a package or the like is separately prepared and a bar code needs to be attached. Accordingly, extra trouble may occur. Although there is a means in which product data of a product to which a bar code is not attached is inputted by a store clerk with a keyboard of an operation screen of a POS-terminal, a big difference in input time of product data sometimes occurs depending on proficiency of the store clerk.

In order to improve the above-described problems, a technique is proposed in which a product is imaged with a camera or the like equipped in a POS-terminal device and the product can be recognized from the captured image data using an image-recognition technique, even for a product to which a bar code is not attached.

For example, PTL 1 discloses a technique in which, when passing a product over a camera equipped in a POS-terminal to scan the color, shape, and package of the product, the scanned image is checked against a database in the terminal in real time and the product, price, or the like can be automatically inputted. In the technique of PTL 1, a product bar code used in a supermarket or the like becomes unnecessary.

Further, PTL 2 proposes a POS-terminal in which a scanning unit is configured by a half mirror. When a product is passed over the surface of the half mirror, a subject image of the product, in particular, a bar code, is reflected in the surface of the half mirror, and thus, the POS-terminal according to PTL 2 has an advantage that an direction of the product can be easily determined when the product is passed.

CITATION LIST

Patent Literatures

PTL 1: JP 2013-182326 A
PTL 2: JP 2013-077330 A

SUMMARY OF INVENTION

Technical Problem

However, in the case of the POS-terminal device with the camera, which is disclosed in PTL 1, the imaged product is confirmed through a monitor provided on the POS-terminal. Thus, whether or not the imaging is performed in a state where a surface to be scanned of the product is correctly passed over the camera, cannot be confirmed without using the monitor. In other words, when the imaging is performed in a state where the product is deviated from a defined imaging area or a part of the product lacks, the product sometimes cannot be correctly scanned. Thus, an operator of a scanning device needs to repeat work to pass the surface to be scanned over a scanning unit over and over while changing the direction of the product or a way to hold the product until the product can be correctly scanned.

The POS-terminal device which is disclosed in PTL 2 supplements the problem of PTL 1. However, since the imaging is performed through the half mirror, there is a problem in that light quantity indication a camera is decreased by half compared to the case where the imaging is performed through normal transmitting (i.e. transparent) glass. Therefore, a product image to be captured may be darkened thereby causing false recognition or the like. In order to solve the problem, PTL 2 discloses that the imaging of the product is performed by using a LED light source provided on the outside of a case enclosing the camera. When a black-and-white bar code is a recognition target as in PTL 2, the imaging of the product using the LED light source does not become problematic. However, when a fresh product whose color and three-dimensional appearance also need to be recognized is a recognition target, a color of the captured image of the product may be different from the actual color of the product under artificial light, such as the LED light source. Therefore, when the fresh product is recognized, it is preferable to capture the product in a state of being illuminated by natural light without using an artificial light source.

In the imaging through the half mirror as disclosed in PTL 2, it is difficult to capture subtle recesses and protrusions, and colors, and even if the subtle recesses and protrusions, and colors can be captured, the probability of false recognition is high. In other words, when a product to be captured has colors, and recesses and protrusions, it is preferable to perform the imaging in an environment illuminated by natural light.

The present invention solves at least one of the above-described problems. Specifically, it is an object of the present invention to provide a POS-terminal device having a structure which guides a product to be captured in a defined imaging area. Further, it is another object of the present invention to provide a POS-terminal device capable of recognizing more accurately a fresh product having a color and a three-dimensional appearance or the like.

Solution to Problem

The POS-terminal device of one exemplary embodiment of the present invention solves the above-described problems by including:

a housing that is provided with a product-reading device including an imaging unit that captures a product to generate an image;

a product-input unit that inputs the product, the product-input unit having a product-reading frame that defines an outer edge of an imaging area of the imaging unit; and a reflector that can reflect a subject image of the product passed over the imaging area, outside the housing.

The POS-terminal device of another exemplary embodiment of the present invention solves the above-described problems by including:

a housing that is provided with a product-reading device including an imaging unit that captures a product to generate an image;

a product-input unit that defines an imaging area of the imaging unit on one surface of the housing, which is opposed to the imaging unit provided in the housing; and a reflector having transmissivity, which is attached to the housing opposed to the imaging unit and can reflect a subject image of the product passed over the imaging area of the imaging unit, and further comprising a transmissive part provided on one surface of the housing through which natural light transmits.

Advantageous Effects of Invention

According to the present invention, a product having colors, and recesses and protrusions can be captured, and whether the product that is a target to be captured is positioned within the imaging area and whether the product is positioned in a correct direction can be confirmed, while confirming a subject image of the product reflected in the reflector without using a specific means that displays, on a monitor or the like, an image of the product that is a subject. Therefore, since actual operating time is shortened and the usability is improved, operating time at a cash register and waiting time of a customer are shortened. According to the present invention, illumination for imaging the product becomes unnecessary. Accordingly, electric power of the POS-terminal device can be saved.

DESCRIPTION OF EMBODIMENTS

In the following, the present invention will be exemplified by a POS-terminal device in a store having a face-to-face cash register between a store clerk and a customer. A POS-terminal device according to exemplary embodiments of the present invention includes a structure that guides a product A to be captured to a defined imaging area X. However, it goes without saying that the present invention is not limited to the face-to-face POS-terminal and can also be applied to a self-checkout POS-terminal. The term "store" here is a supermarket or the like that deals in products having colors, and recesses and protrusions, such as fresh food.

First Exemplary Embodiment

Figure 1:
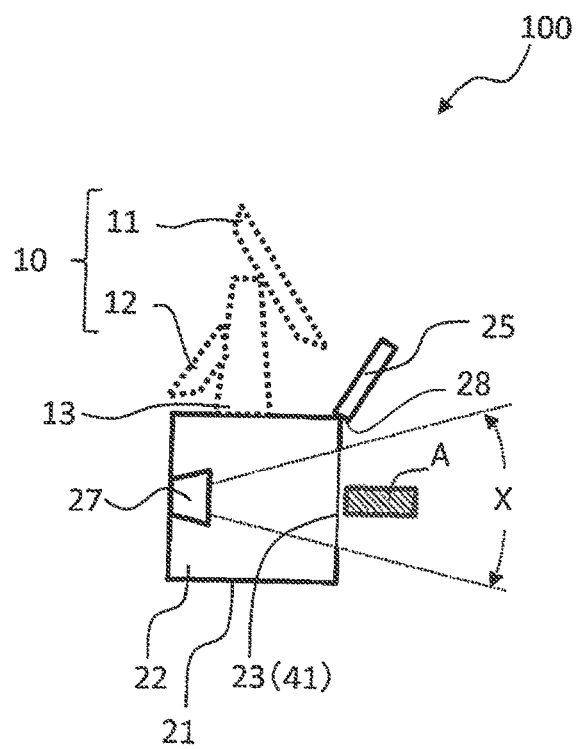
FIG. 1 is a schematic configuration diagram of a POS-terminal device according to a first exemplary embodiment of the present invention, and also illustrates a diagram in which an image of passing a product over an imaging area is viewed from the side of the POS-terminal device.
Figure 2:
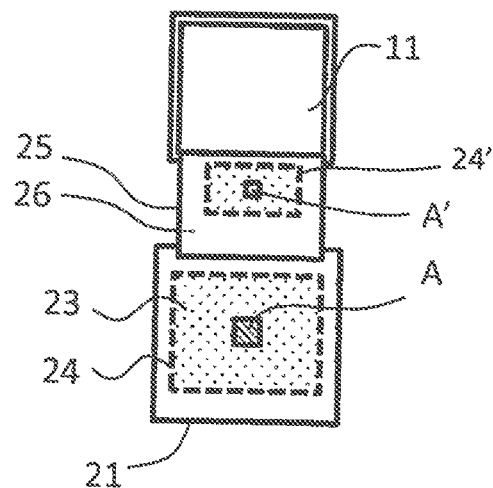
FIG. 2 illustrates a schematic diagram in which an image of the captured product reflected on a reflector by passing the product illustrated in FIG. 1 over the imaging area is viewed from the front of the POS-terminal device.

FIG. 1 and FIG. 2 illustrate a POS-terminal device 100 according to a first exemplary embodiment of the present invention. Specifically, in order to guide a product A to be captured to a defined imaging area X, the POS-terminal device 100 of the present invention includes a housing 21 that is provided with a product-reading device 22 including an imaging unit 27 that captures the product A to generate an image of the product. The POS-terminal device 100 further includes a reflector (here, reflecting mirror) 25. In this example, the reflector 25 is provided on the outside of the housing 21.

Specifically, in the store having a face-to-face cash register between a store clerk and a customer, the POS-terminal device 100 may include an information-processing device 13, and a monitor unit 10 includes a displaying-operating unit for store clerk 11 by which a store clerk can confirm information regarding to the captured product A and a displaying unit for customer 12 that displays information of a purchased product, which are indicated by the dotted line in FIG. 1.

The reflector 25 illustrated in FIG. 2 is provided on one surface of the housing 21, which is a surface opposed to the imaging unit 27 equipped in the housing 21. The reflector 25 is provided at a position where a product-input unit 23 that defines the imaging area X of the imaging unit 27 and a subject image A' of the product A passed over the imaging area X of the imaging unit 27 can be reflected. The reflector 25 defines a region where whether or not the subject image A' of the product A is included in the imaging area X can be visually confirmed.

Furthermore, as illustrated in FIG. 1 and FIG. 2, the product-input unit 23 includes a product-reading frame 24 that defines the outer edge of the imaging area X of the imaging unit 27, and the region that can be visually confirmed by the reflector 25 is within a range where the product-reading frame 24 can be visually recognized.

Example of the product-input unit 23 includes a member that is located at a position opposed to the imaging unit 27 equipped in the product-scanning device 22 and is made of a light-transmissive material (glass or the like).

The reflector 25 illustrated in FIG. 1 and FIG. 2 is located on an upper end part 28 of the housing 21. When the reflector 25 is configured to be held by the upper end part 28 of the housing 21 above the product-input unit 23 as illustrated in FIG. 1, the reflector 25 is placed such that a reflecting surface 26 of the reflector 25 can tilt to the product A. As illustrated in FIG. 2, the reflector 25 may be provided at a position adjacent to the displaying-operating unit for store clerk 11 such that a store clerk can view the subject image A' of the product A reflected in the reflector 25 and the displaying-operating unit for store clerk 11 at the same time.

In the configuration of the POS-terminal device 100 illustrated in FIG. 1, when the POS-terminal device 100 is viewed from the front as in FIG. 2, the subject image A' of the product A and a subject image 24' of the product-reading frame 24 are seen on the upper side of the reflector 25, due to the positional relationship between the attaching position of the reflector 25 and the product-input unit 23.

Second Exemplary Embodiment

Figure 3:
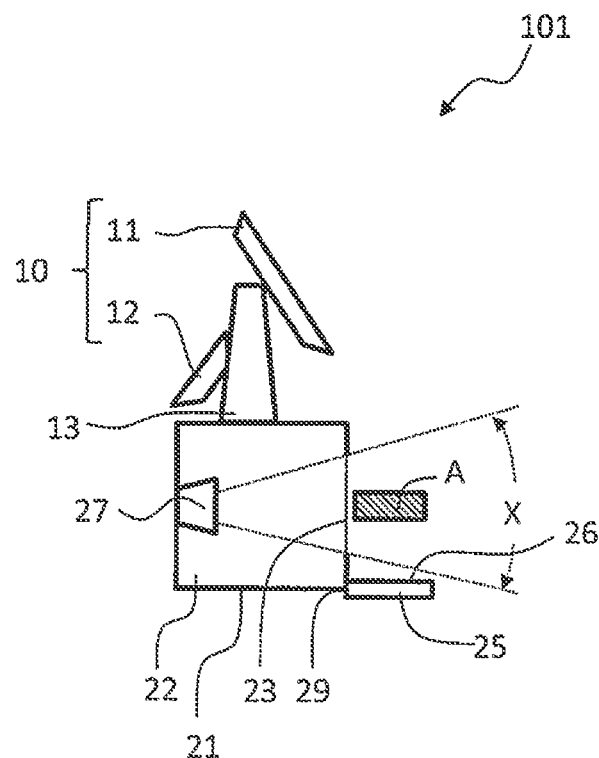
FIG. 3 is a schematic configuration diagram of a POS-terminal device according to a second exemplary embodiment of the present invention, and also illustrates a diagram in which an image of passing a product over an imaging area is viewed from the side of the POS-terminal device.
Figure 4:
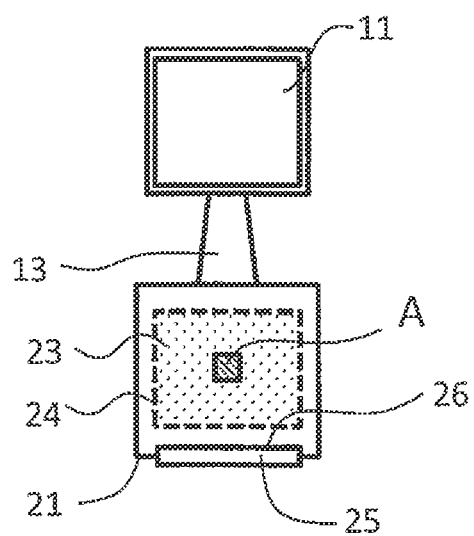
FIG. 4 illustrates a schematic diagram in which an image of passing the product illustrated in FIG. 3 over the imaging area is viewed from the front of the POS-terminal device.
Figure 5:
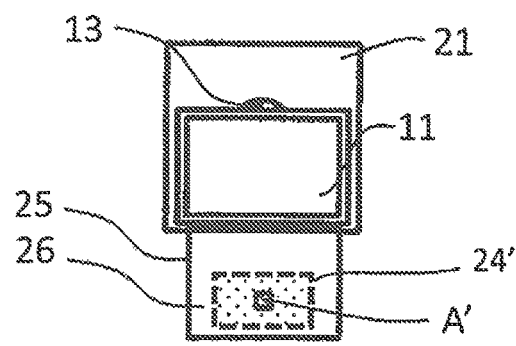
FIG. 5 illustrates a schematic diagram in which an image of a subject image of the product reflected in a reflector by passing the product illustrated in FIG. 3 over the imaging area is viewed from the top of the POS-terminal device.

FIG. 3 to FIG. 5 illustrate a POS-terminal device 101 according to a second exemplary embodiment of the present invention, where the reflector 25 is provided at a position different from the position illustrated in FIG. 1 and FIG. 2. Specifically, in the example illustrated in FIG. 3, FIG. 4, and FIG. 5, in order to facilitate viewing the subject image A' of the product A reflected in the reflector 25, the reflector 25 is provided to be held by a lower end part 29 of the housing 21 below the product-input unit 23. One side of the reflector 25, which is not held by the lower end part 29 of the housing 21 below the product-input unit 23, extends toward the outside of the product-input unit 23, and is located so as to be perpendicular to the product-input unit 23.

In the configuration of the POS-terminal device 101 illustrated in FIG. 3, when the POS-terminal device 101 is viewed from the direction of FIG. 5, the subject image A' of the product A and the subject image 24' of the product-reading frame 24 are seen on the front side (lower side) of the housing 21, due to the positional relationship between the attaching position of the reflector 25 and the product-input unit 23.

Third Exemplary Embodiment

Figure 6:
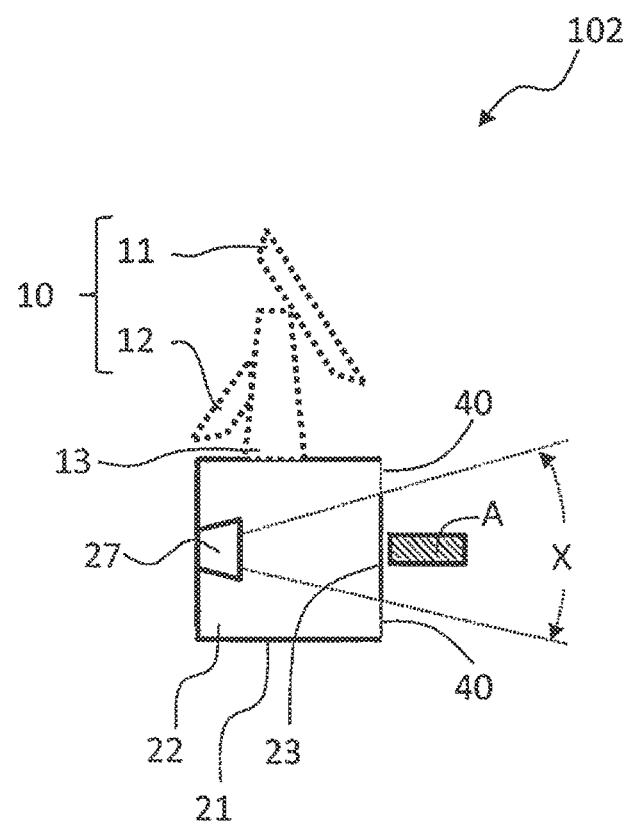
FIG. 6 is a schematic configuration diagram of a POS-terminal device according to a third exemplary embodiment of the present invention, and also illustrates a diagram in which an image of passing a product over an imaging area is viewed from the side of the POS-terminal device.
Figure 7:
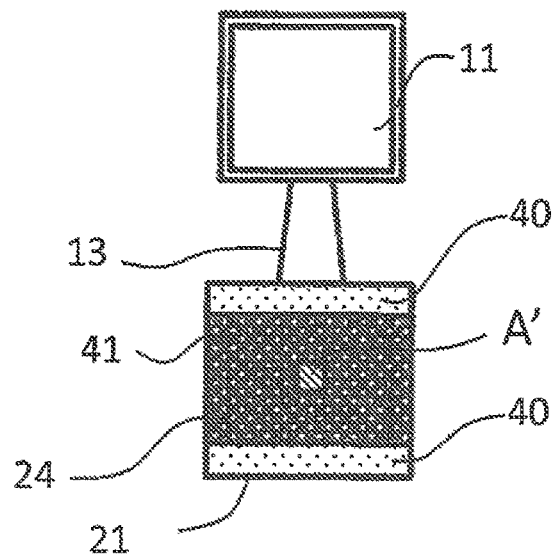
FIG. 7 illustrates a schematic diagram in which an image of passing the product illustrated in FIG. 6 over the imaging area is viewed from the front of the POS-terminal device.

FIG. 6 and FIG. 7 illustrate a POS-terminal device 102 according to a third exemplary embodiment of the present invention. Specifically, in order to guide the product A to be captured to the defined imaging area X, the POS-terminal device 102 of the present invention includes the housing 21 that is provided with the product-reading device 22 including the imaging unit 27 that captures the product A to generate an image, and a reflector (half mirror) 41 having transmissivity, which is provided on the housing 21 opposed to the imaging unit 27.

Although the example using the half mirror 41 whose transmittance and reflectance are respectively 50%, as the reflector having transmissivity, is described in the present exemplary embodiment, the transmittance and the reflectance can be appropriately changed without being limited to 50%. Although the example in which the half mirror 41 is provided on one surface outside the housing 21 is described in the present exemplary embodiment, a place on which the half mirror 41 is provided is not necessarily limited to one outside surface, and for example, the half mirror 41 may be provided at an arbitrary position of an inner surface of the housing 21, which is opposed to the imaging unit 27.

Further, in a store having a face-to-face cash register between a store clerk and a customer, the POS-terminal device 102 may include the information-processing device 13, and the monitor unit 10 consisting of the displaying-operating unit for store clerk 11 by which a store clerk can confirm information regarding the captured product A and the displaying unit for customer 12 that outputs information of a purchased product, which are indicated by the dotted line in FIG. 6.

As illustrated in FIG. 7, positions of a left end and a right end of the half mirror 41 may extend to both ends of the housing 21. Furthermore, a transmissive part 40 which transmits natural light may be provided on one surface of the housing 21 so as to sandwich the half mirror 41 in a vertical direction. The transmissive part 40 may be made of glass or the like, or the transmissive part 40 may be provided by forming an opening in the housing 21. The transmissive part 40 can compensate for a decrease in light quantity due to the half mirror 41. Therefore, by providing the transmissive part 40, the imaging unit 27 can capture the product A passed over the imaging area X while using brightness of the natural light taken in the product-reading device 22 without a light source, such as a LED.

The POS-terminal device 102 illustrated in FIG. 6 and FIG. 7 further includes the product-input unit 23 that defines the imaging area X of the imaging unit 27 on one surface of the housing 21, which is opposed to the imaging unit 27 equipped in the housing 21, and the half mirror 41 that is attached to one surface of the housing 21, which is opposed to the imaging unit 27, and that can reflect the subject image A' of the product A passed over the imaging area X of the imaging unit 27. The transmissive part 40 which transmits natural light is provided on a part of one surface of the housing 21.

In other words, in the third exemplary embodiment, the product A to be captured can be guided to the defined imaging area X by the half mirror 41 in place of the reflector 25 in the first exemplary embodiment and the second exemplary embodiment. The half mirror 41 can define a region where the imaging area X can be visually confirmed by visual confirmation (i.e. visual confirmation region).

Furthermore, the half mirror 41 of the POS-terminal device 102 configures a part of the product-input unit 23, and includes the product-reading frame 24 (refer to dashed line) that defines the outer edge of the imaging area X of the imaging unit 27, inside the outer edge of the half mirror 41. More specifically, the image A' of the product A reflected in the surface of the half mirror 41 within the range of the product-reading frame 24 is reflected in the imaging area X of the product A.

Figure 8:
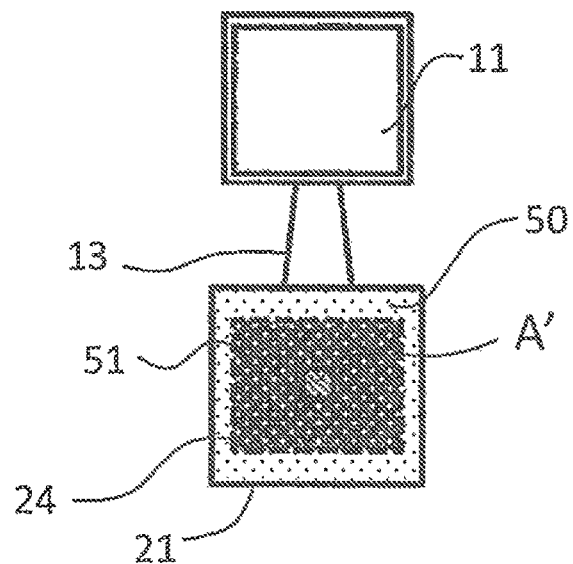
FIG. 8 illustrates a schematic diagram in which a modified example of the POS-terminal device according to the third exemplary embodiment of the present invention is viewed from the front.

FIG. 8 illustrates a modified example of the POS-terminal device 102 according to the third exemplary embodiment of the present invention. The third exemplary embodiment illustrated in FIG. 7 includes the half mirror 41 provided in the central part of the transmissive part 40. On the other hand, a half mirror 51 of the POS-terminal device illustrated in FIG. 8 has the same size as that of the outer edge of the product-reading frame 24. In order to take in more natural light than the transmissive part 40 in the third exemplary embodiment, a transmissive part 50 is provided in such a way that it surrounds the whole of the half mirror 51.

Fourth Exemplary Embodiment

Figure 9:
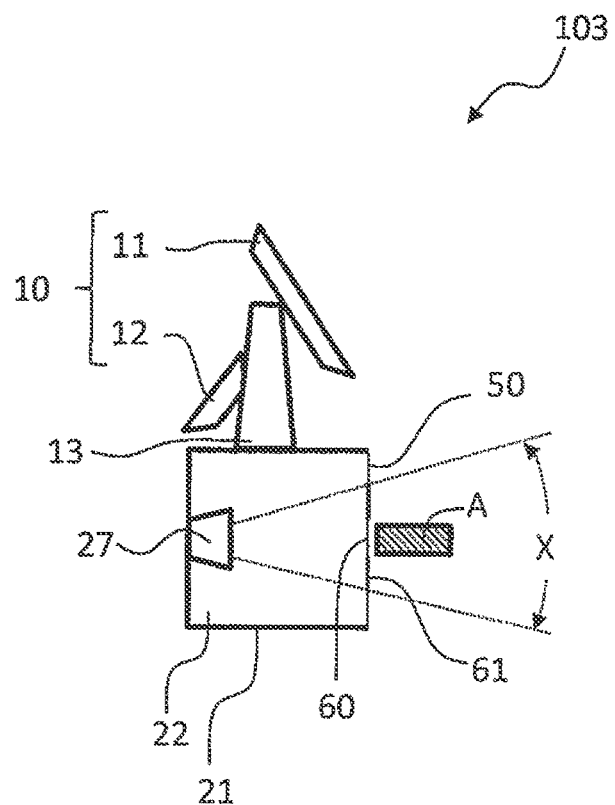
FIG. 9 is a schematic configuration diagram of a POS-terminal device according to a fourth exemplary embodiment of the present invention, and also illustrates a diagram in which an image of passing a product over an imaging area is viewed from the side of the POS-terminal device.
Figure 10:
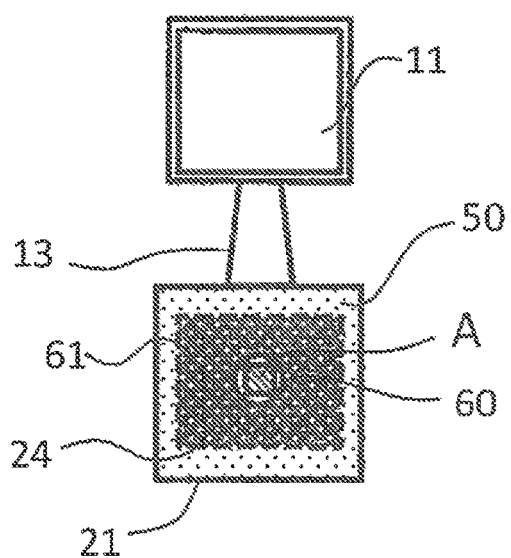
FIG. 10 illustrates a schematic diagram in which an image of passing the product illustrated in FIG. 9 over the imaging area is viewed from the front of the POS-terminal device.

FIG. 9 and FIG. 10 illustrate a POS-terminal device 103 according to a fourth exemplary embodiment of the present invention. Specifically, the POS-terminal device 103 according to the fourth exemplary embodiment includes a half mirror 61 including a transmissive part 60 for confirming colors, and recesses and protrusions of the product A, in an approximately center region opposed to the imaging unit 27.

In the following, a method for guiding the product A that is a target to be captured to the defined imaging area X will be described with reference to FIG. 1 and FIG. 2. The product-reading frame 24 on the side of the housing 21 of the product A that is a target to be captured is the imaging area X. In other words, the product A is made to be oriented to the direction of the reflector 25 so as to be fit within the product-reading frame 24. In this case, the subject image A' of the product A is reflected in the reflector 25 provided outside the housing 21. An operator guides the product to the imaging area X while confirming that the subject image A' of the product A is fit within the reflected subject image 24' of the product-reading frame 24. By capturing the product A in such a state, the product A can be recognized. Accordingly, the operator of the POS-terminal device 100 can easily confirm whether or not the product A is deviated from the imaging area X while viewing the image of the reflector 25. More specifically, the operator does not need to repeat work to pass a product over and over. Therefore, the efficiency of product-recognizing work can be improved.

Although the present invention is described with reference to the exemplary embodiments, the present invention is not limited to the exemplary embodiments. Various modifications that a person skilled in the art can understand can be made to configurations and details of the present invention within the scope of the present invention.

For example, in order to be able to confirm a large-size product (watermelon, Japanese radish, or the like) through a reflector, a reflecting mirror, such as a wide-angle mirror, may be used for the reflector 25 illustrated in FIGS. 1 and 2, and if necessary, an angle-adjustable function may be applied such that the angle of the reflector 25 is located at an appropriate position in a store equipped with the POS-terminal device.

The present invention can be applied to a self-checkout POS-terminal. In this case, the displaying-operating unit for store clerk 11 illustrated in the present exemplary embodiments includes the monitor unit 10 with the displaying unit for customer 12.

Further, regarding the transmissive part 60 for confirming colors, and recesses and protrusions of the product A, which is illustrated in FIG. 9 and FIG. 10, within the range of the product-reading frame 24, in which colors, and recesses and protrusions of the product A can be confirmed, the transmissive part 60 may be provided, for example, at an end part or an arbitrary place of the half mirror 61 as well as at the center of the half mirror 61. Furthermore, a plurality of the transmissive parts 60 may be provided on the surface of the half mirror 61, or the transmissive part 60 may have an arbitrary shape.

The half mirror 61 including the transmissive part 60 at the center of the POS-terminal device 103 illustrated in FIG. 9 and FIG. 10 can also be applied to the half mirror 41 of the POS-terminal device 102 illustrated in FIG. 6 and FIG. 7, or the half mirror 51 of the POS-terminal device 102 illustrated in FIG. 8.

Figure 11:
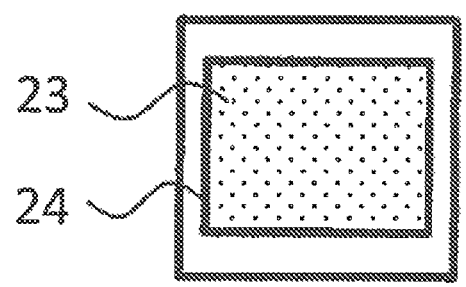
FIG. 11 illustrates one exemplary embodiment in a state where a marking for clarifying a product-reading frame of the POS-terminal devices illustrated in the first to fourth exemplary embodiments of the present invention is formed on one surface of a product-input unit.
Figure 12:
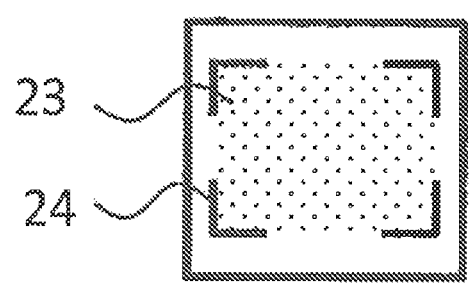
FIG. 12 illustrates another exemplary embodiment in a state where a marking for clarifying a product-reading frame of the POS-terminal devices illustrated in the first to fourth exemplary embodiments of the present invention is formed on one surface of the product-input unit.

Further, a marking for clarifying the product-reading frame 24 of the POS-terminal devices illustrated in the first to fourth exemplary embodiments of the present invention, as in FIG. 11 or FIG. 12, may be formed on one surface of the product-input unit 23.

INDUSTRIAL APPLICABILITY

The present invention can be applied to a supermarket, a store that conducts face-to-face selling, or the like having a POS-terminal device.

This application claims priority based on Japanese Patent Application No. 2014-067814 filed on Mar. 28, 2014, the disclosure of which is incorporated herein in its entirety.

REFERENCE SIGNS LIST 100, 101, 102, 103 POS-terminal device
10 monitor unit
11 displaying-operating unit for store clerk
12 displaying unit for customer
13 information-processing device
21 housing
22 product-reading device
23 product-input unit
24 product-reading frame
24' subject image of product-reading frame 24
25 reflector (reflecting mirror)
26 reflecting surface
27 imaging unit
28 upper end part
29 lower end part
40 transmissive part (for taking in natural light)
41 reflector (half mirror)
50 transmissive part (for taking in natural light)
51 half mirror
60 transmissive part (for confirming colors, and recesses and protrusions)
61 half mirror
A product
A' subject image of product A
X imaging area

The invention claimed is:

1. A POS-terminal device comprising:
a housing that is provided with a product-reading device including an imaging unit configured to capture a product to generate an image;
a product-input unit configured to input the product, the product-input unit including a product-reading frame configured to define an outer edge of an imaging area of the imaging unit on one surface of the housing, which is opposed to the imaging unit provided in the housing; and
a reflector having transmissivity, which is attached to the housing opposed to the imaging unit and can reflect a subject image of the product passed over the imaging area of the imaging unit, wherein the reflector is a half mirror and is located at a position to reflect a region in which whether or not the product is included in the imaging area within a range of the product-reading frame can be visually confirmed, and wherein a transmissive part provided on one surface of the housing in a region opposed to the imaging unit transmits natural light which is provided from at least one part of an outer periphery or a central part of the half mirror.

2. The POS-terminal device according to claim 1, wherein the product-input unit is made of a light-transmissive material provided in the product-input unit, and the reflector is held by either an upper end part or a lower end part of the housing, and is provided at a position where the subject image of the product passed over the imaging area can be reflected.

3. The POS-terminal device according to claim 2, wherein a reflecting surface of the reflector provided to be held by the upper end part of the housing above the product-input unit is configured to tilt to the product.

4. The POS-terminal device according to claim 3, wherein the POS-terminal device includes a monitor unit configured to display information regarding the captured product, the monitor unit includes a displaying-operating unit for a store clerk by which the store clerk can confirm the information regarding the captured product and a displaying unit for a customer configured to display information of a purchased product, and the reflector configured to be provided at a position adjacent to the displaying-operating unit for the store clerk.

5. The POS-terminal device according to claim 2, wherein one side of the reflector is held by the lower end part of the housing below the product-input unit, and the other side of the reflecting object, which is not held by the lower end part of the housing below the product-input unit, extends toward the outside of the product-input unit.

6. The POS-terminal device according to claim 5, wherein a reflecting surface of the reflector is oriented to a side of the product.

7. The POS-terminal device according to claim 1, wherein the transmissive part transmitting natural light is glass.

8. The POS-terminal device according to claim 1, wherein a displaying-operating unit for a store clerk is provided to a side of the reflector having transmissivity.

9. The POS-terminal device according to claim 1, wherein a marking of the product-reading frame is formed on one surface of the product-input unit.

* * * * *